(12) United States Patent
Chen

(10) Patent No.: US 11,408,753 B2
(45) Date of Patent: Aug. 9, 2022

(54) LOCK MONITORING DEVICE

(71) Applicant: Te-Yu Chen, Pingtung (TW)

(72) Inventor: Te-Yu Chen, Pingtung (TW)

(*) Notice: Subject to any disclaimer, the term of this patent is extended or adjusted under 35 U.S.C. 154(b) by 302 days.

(21) Appl. No.: 16/868,502

(22) Filed: May 6, 2020

(65) Prior Publication Data

US 2021/0348946 A1 Nov. 11, 2021

(51) Int. Cl.
*G01D 5/14* (2006.01)
*E05B 47/00* (2006.01)
*G01D 5/34* (2006.01)

(52) U.S. Cl.
CPC ............ *G01D 5/145* (2013.01); *E05B 47/00* (2013.01); *G01D 5/342* (2013.01); *E05B 2047/0069* (2013.01)

(58) Field of Classification Search
CPC ........ G01D 5/145; G01D 5/342; E05B 47/00; E05B 2047/0069; E05B 2047/0094; E05B 39/00; E05B 59/00
See application file for complete search history.

(56) References Cited

U.S. PATENT DOCUMENTS

2021/0034882 A1* 2/2021 Johnson ............. G07C 9/00309
2021/0134091 A1* 5/2021 Bytheway .......... G07C 9/00182

* cited by examiner

*Primary Examiner* — Tony Ko
(74) *Attorney, Agent, or Firm* — Leong C. Lei

(57) ABSTRACT

A lock monitoring device includes a detection unit and a plurality of sensors, where the detection unit is configured with a thin circuit board configured with a plurality of detection elements, allowing the detection elements to be connected in parallel with a circuit and then connected to a control circuit; the sensors are configured on parts of the lock such as lock tongues, rotating shaft and correspond to the detection elements; whereby, when the lock is unlocked and locked, the detection elements will detect that the detection elements depart from detection positions and send detection signals to a remote monitoring host, and the monitoring host monitors and records the number and time of the unlocking of the lock, achieving smart access control and further allowing the lock to be safer.

4 Claims, 4 Drawing Sheets

LOCK MONITORING DEVICE

TECHNICAL FIELD OF THE INVENTION

The present invention relates to a lock monitoring device, and more particularly to a lock monitoring structure capable of monitoring and recording the unlocking state of the lock so as to achieve smart access control.

DESCRIPTION OF THE PRIOR ART

Traditional locks are locked to close a door through the rotation of internal rotating shafts after persons enter rooms, and the locks are locked or unlocked with keys when going out. Although hotels, important occasions and even homes may be installed with credit card machines due to technical progress, allowing persons to only need to swipe cards upon entering, and further capable of access control and recording the number and time of in and out, such kind of electronic locks in connection with credit card machines are more suitable for working places such as larger companies, factories, or education locations such as schools.

In general locations without needing credit card machines such as smaller factories or apartment buildings, the current locks cannot completely achieve the monitoring and recording functions unless access control systems are extraordinarily installed when monitoring and recording the number and time of in and out is also needed.

SUMMARY OF THE INVENTION

The main object of the present invention is to provide a lock monitoring device, allowing the unlocking state of a lock to be remotely monitored, recorded, thereby achieving smart access control and anti-theft.

To achieve the above object, the present invention proposes a lock monitoring device, including a detection unit and a plurality of sensors, where the detection unit is configured with a thin circuit board configured with a plurality of detection elements, allowing the detection elements to be connected in parallel with a circuit and then connected to a control circuit; the sensors are configured on parts of the lock such as lock tongues, rotating shaft and correspond to the detection elements; whereby, when the lock is unlocked and locked, the detection elements will detect that the detection elements depart from detection positions and send detection signals to a remote monitoring host, and the monitoring host monitors and records the number and time of the unlocking of the lock, achieving smart access control and further allowing the lock to be safer.

According to the lock monitoring device mentioned above, the sensors configured on the parts of the lock such as the lock tongues and rotating shaft are magnetic bodies.

According to the lock monitoring device mentioned above, the detection elements configured on the circuit board are Hall elements.

According to the lock monitoring device mentioned above, the control circuit is configured with a C-shaped case, allowing the case to be clamped below the lock so as to be in connection with the circuit of the circuit board.

According to the lock monitoring device mentioned above, the sensors configured on parts of the lock such as a square lock tongue, triangular tongue and rotating shaft are reflectors.

According to the lock monitoring device mentioned above, the detection elements configured on the circuit board are infrared transmitting and receiving elements.

DETAILED DESCRIPTION OF THE PREFERRED EMBODIMENTS

Figure 1:
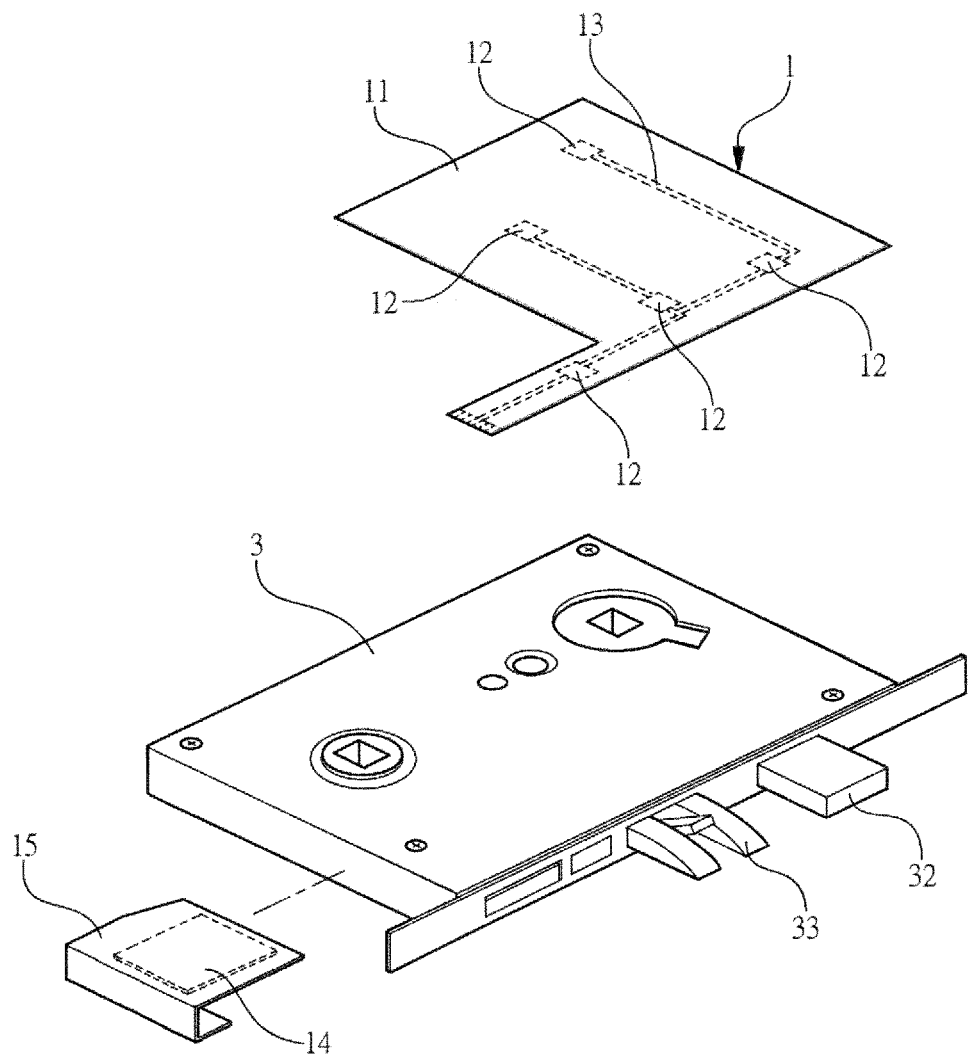
FIG. 1 is an exploded view of the present invention.
Figure 2:
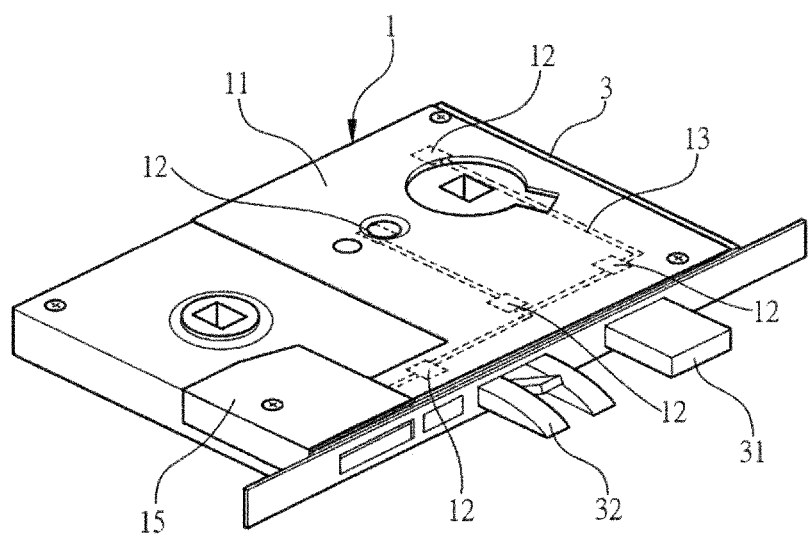
FIG. 2 is a perspective view of the present invention.
Figure 3:
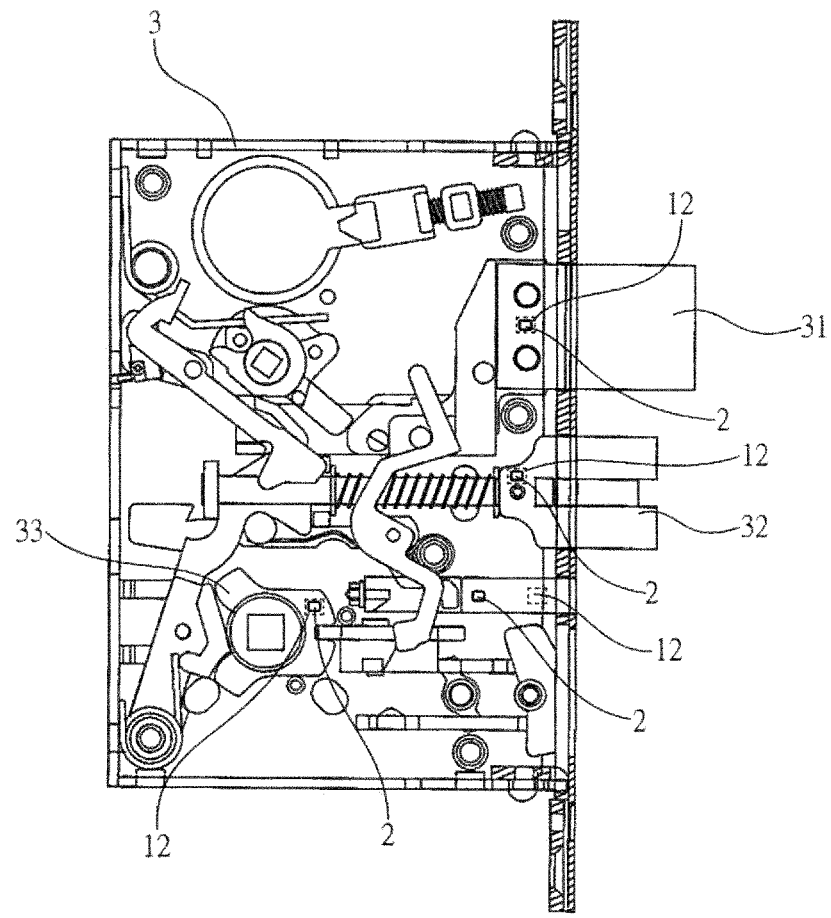
FIG. 3 is a plan view of the present invention.

Referring to FIGS. 1 to 3, a lock monitoring device of the present invention includes a detection unit 1 and a plurality of sensors 2, where the detection unit 1 is configured with a thin circuit board 11, on which a plurality of detection elements 12 are configured, allowing the detection elements 12 to be in connection with a control circuit 14 after they are connected in parallel with a circuit 13. In a preferred embodiment, the detection elements 12 provided on the circuit board 11 are Hall elements, and the control circuit 14 is accepted in a C-shaped case 15 which can be clamped below the lock 3 for the connection thereof with the circuit 13 of the circuit board 11.

The sensor 2 is respectively configured on parts of the lock 3 such as a square lock tongue 31, triangular tongue 32 and rotating shaft 33, allowing the detection elements 12 of the detection unit 1 to correspond to the sensors 2. In the embodiment, the sensors 2 are magnetic bodies.

In another preferred embodiment, the detection elements 12 configured on the circuit board respectively are an infrared transmitting and receiving element, the sensors 2 configured on parts of the lock 3 such as the square lock tongue 31, triangular tongue 32 and rotating shaft 33 may be reflectors, and the lock 3 is configured with through holes corresponding to detection elements 12 and sensors 2, allowing the detection elements 12 to detect the sensors 2.

Upon the assembly of the lock 3, the square lock tongue 31, triangular lock tongue 32 and rotating shaft 33 of the lock 3 are respectively configured and fixed with the sensor 2, the circuit board 11 provided with the detection elements 12 are then attached to the surface of the lock 3, and the circuit 13 is connected to the control circuit 14. After the circuit board 11 is attached and fixed, the detection elements 12 will correspond to the sensors 2 of the lock 3.

With the combination of the above components, the lock monitoring device is formed. Whereby, upon the unlocking and locking of the lock 3, the detection elements 12 will detect the sensor 2 configured on the square lock tongue 31, triangular lock tongue 32 and rotating shaft 33 being departed from the locking positions, the detection signals are transmitted to the control circuit 14, and the control circuit 14 transmits the detected messages to a remote monitoring host, and the monitoring host monitors and records the number and time of the unlocking of the lock, achieving smart access control and anti-theft effects, and allowing the lock to be safer.

Referring to FIGS. 1 and 3 again, the present invention configures and fixes the sensor 2 respectively on the parts such as the square tongue 31, triangular lock tongue 32 and rotating shaft 33 and attaches the circuit board 11 of the detection unit 1 to the surface of the lock 3, allowing the detection elements 12 of the detection unit 1 to correspond to the sensors 2. In addition, the control circuit 14 accepted in the case 15 is configured below the lock 3, allowing the circuit 13 of the circuit board 11 to be in connection with the control circuit 14.

Figure 4:
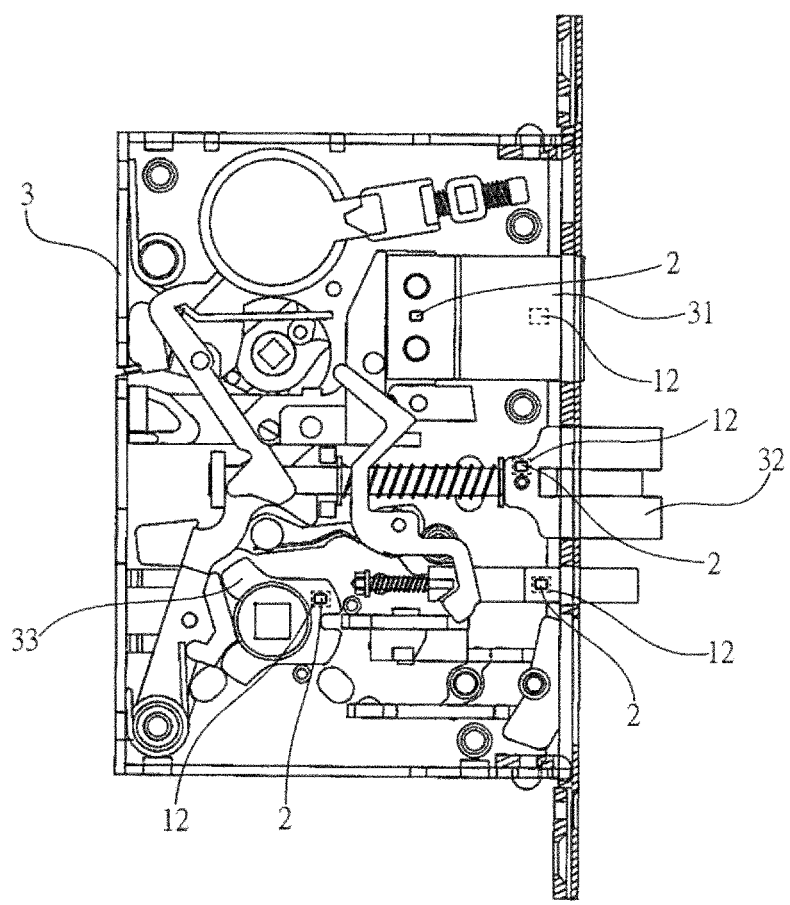
FIG. 4 is a plan view of the present invention in an action state.

Referring to FIG. 4, the control circuit 14 is connected to a remote monitoring host (via wired or wireless network), where the parts such as square lock tongue 31, triangular lock tongue 32 and rotating shaft 33 will be moved levelly or circularly when the lock 3 is unlocked or locked, allowing the sensors 2 configured on the parts such as the square lock tongue 31, triangular lock tongue 32 and rotating shaft 33 to be departed from the detection elements 13 of the circuit board 11.

Furthermore, the sensors 2 configured on the parts such as the square lock tongue 31, triangular lock tongue 32 and rotating shaft 33 are overlapped with the detection elements 12 of the circuit board 11 when the lock 3 is locked so that the detection elements 12 can detect the sensors 2. At this time, the control circuit 14 transmits the detection signals to the remote monitoring host. When the lock 3 is unlocked, the sensors 2 configured on the parts such as the square lock tongue 31, triangular lock tongue 32 and rotating shaft 33 are departed from the detection elements from the detection elements 2 of the circuit board 11. At this time, the control circuit 14 transmits the detected departing signals (which are the signals that the sensors are unable to be detected) to the remote monitoring host so that the monitoring host can then know that the lock 3 is unlocked, capable of achieving the anti-theft object.

When the lock 3 is locked after unlocked, the sensors 2 configured on the parts such as square lock tongue 31, triangular lock tongue 32 and rotating shaft 33 will be overlapped with the detection elements 12 of the circuit board 11 again. At this time, the control circuit 14 transmits the detection signals (which are signals that the sensors 2 are detected) to the remote monitoring host so that it can calculate the number and time of unlocking and locking in turn, thereby achieving smart access control (for example, 50 people is set to be able to enter, then the 51st will not be allowed to enter, or the record has entered 50 people, but only 49 people left, it can be known that 1 person has not left) and the anti-theft object, further allowing the lock to be safer.

To sum up, the present invention uses the circuit board configured with the plurality of detection elements and connects them with the control circuit of the circuit board and operates them in coordination with the sensors configure on the lock tongues and rotating shaft to form the lock monitoring device so as to allow the unlocking state of the lock to be remotely monitored and recorded, thereby achieving the smart access control and anti-theft object.

I claim:

1. A lock monitoring device, comprising a detection unit and a plurality of sensors, wherein said detection unit is configured with a thin circuit board configured with a plurality of detection elements, allowing said detection elements to be connected in parallel with a circuit and then connected to a control circuit; said sensors are configured on parts of said lock such as lock tongues, rotating shaft and correspond to said detection elements; whereby, when said lock is unlocked and locked, said detection elements will detect that said detection elements depart from detection positions and send detection signals to a remote monitoring host, and said monitoring host monitors and records the number and time of said unlocking of said lock, achieving smart access control and further allowing said lock to be safer.

2. The device according to claim 1, wherein said sensors configured on said parts of said lock such as said lock tongues and rotating shaft are magnetic bodies, and said detection elements configured on said circuit board are Hall elements.

3. The device according to claim 1, wherein said sensors configured on said parts of said lock such as said lock tongues and rotating shaft are reflectors, and said detection elements configured on said circuit board are infrared transmitting and receiving elements.

4. The device according to claim 1, wherein said control circuit is configured with a C-shaped case, allowing said case to be clamped below said lock so as to be in connection with said circuit of said circuit board.

* * * * *